(12) United States Patent
Shoen et al.

(10) Patent No.: US 8,135,627 B2
(45) Date of Patent: *Mar. 13, 2012

(54) ONLINE MARKETPLACE FOR MOVING AND RELOCATION SERVICES

(75) Inventors: Edward J. Shoen, Scottsdale, AZ (US); Samuel J. Shoen, Scottsdale, AZ (US); Srinivasan Venkataraman, Phoenix, AZ (US); John Anthony Kestner, Tempe, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/364,457

(22) Filed: Feb. 2, 2009

(65) Prior Publication Data

US 2009/0187436 A1    Jul. 23, 2009

Related U.S. Application Data

(62) Division of application No. 10/083,726, filed on Oct. 19, 2001, now Pat. No. 7,487,111.

(51) Int. Cl.
G06Q 30/00 (2006.01)

(52) U.S. Cl. ...... 705/26.41; 705/5; 705/26.81; 705/27.1

(58) Field of Classification Search .................... 705/26, 705/27

See application file for complete search history.

(56) References Cited

U.S. PATENT DOCUMENTS 5,555,496 A 9/1996 Tackbary et al.
5,566,291 A 10/1996 Boulton et al.
5,576,951 A 11/1996 Lockwood
5,621,797 A * 4/1997 Rosen ............................. 705/76

(Continued)

FOREIGN PATENT DOCUMENTS

WO    PCTUS0023350    8/2000

OTHER PUBLICATIONS

Home-Link: PR Newswire, "Home-Link launches as US largest provider of customized, web-enable residential customer support programs, 22 major . . . ", "56412117", Jul. 14, 2000, p. 4.

(Continued)

*Primary Examiner* — Rober M. Pond
(74) *Attorney, Agent, or Firm* — Richard E. Oney; Tiffany & Bosco, P.A.

(57) ABSTRACT

Methods and systems for operating an online marketplace for the sale of goods and services associated with self-help moving and relocating are described. A customer enters an online marketplace where vendors offer services and goods relating to moving and relocating, specifically in the "do-it-yourself" moving field. The venue for the online marketplace is an Internet web site or a site on a computer network and is operated by a host that determines which vendors will be listed on the site. Once in the marketplace, the customer can view informational content on numerous vendors providing services relating to moving and relocating. Based on the estimates provided by the marketplace as well as reviews, ratings, customer feedback, and background information on the vendors, the customer selects a vendor and "prepays for" the vendor's services on the marketplace. The customer is then provided a confirmation code. The code is given to the vendor upon completion of service or delivery of the good to the customer's satisfaction. The vendor accesses the online marketplace and enters the confirmation code to activate a payment for the service or good.

24 Claims, 14 Drawing Sheets

U.S. PATENT DOCUMENTS

| | | | |
|---|---|---|---|
| 5,732,398 | A | 3/1998 | Tagawa |
| 5,749,075 | A | 5/1998 | Toader et al. |
| 5,774,869 | A | 6/1998 | Toader |
| 5,794,207 | A | 8/1998 | Walker et al. |
| 5,794,221 | A | 8/1998 | Egendorf |
| 5,797,127 | A | 8/1998 | Walker et al. |
| 5,799,151 | A | 8/1998 | Hoffer |
| 5,832,451 | A | 11/1998 | Flake et al. |
| 5,864,818 | A | 1/1999 | Feldman |
| 5,890,137 | A | 3/1999 | Koreeda |
| 5,893,075 | A | 4/1999 | Plainfield et al. |
| 5,895,454 | A | 4/1999 | Harrington |
| 5,897,620 | A | 4/1999 | Walker et al. |
| 5,903,880 | A | 5/1999 | Biffar |
| 5,913,204 | A | 6/1999 | Kelly |
| 5,946,660 | A | 8/1999 | McCarty et al. |
| 5,948,054 | A | 9/1999 | Nielsen |
| 5,950,172 | A | 9/1999 | Klingman |
| 5,953,706 | A | 9/1999 | Patel |
| 5,970,467 | A | 10/1999 | Alavi |
| 5,973,619 | A | 10/1999 | Paredes |
| 5,999,914 | A | 12/1999 | Blinn et al. |
| 6,016,504 | A | 1/2000 | Arnold et al. |
| 6,029,141 | A | 2/2000 | Bezos et al. |
| 6,029,150 | A * | 2/2000 | Kravitz ............................ 705/39 |
| 6,041,310 | A | 3/2000 | Green et al. |
| 6,049,777 | A | 4/2000 | Sheena et al. |
| 6,049,779 | A | 4/2000 | Berkson |
| 6,055,513 | A | 4/2000 | Katz et al. |
| 6,064,980 | A | 5/2000 | Jacobi et al. |
| 6,064,981 | A | 5/2000 | Barni et al. |
| 6,070,145 | A | 5/2000 | Pinsely et al. |
| 6,070,148 | A | 5/2000 | Mori et al. |
| 6,070,149 | A | 5/2000 | Tavor et al. |
| 6,085,168 | A | 7/2000 | Mori et al. |
| 6,085,177 | A | 7/2000 | Semple et al. |
| 6,092,053 | A | 7/2000 | Boesch et al. |
| 6,101,477 | A | 8/2000 | Hohle et al. |
| 6,101,482 | A | 8/2000 | DiAngelo et al. |
| 6,102,287 | A | 8/2000 | Matyas, Jr. |
| 6,188,994 | B1 | 2/2001 | Egendorf |
| 6,189,029 | B1 | 2/2001 | Fuerst |
| 6,196,458 | B1 | 3/2001 | Walker et al. |
| 6,219,653 | B1 | 4/2001 | O'Neil et al. |
| 6,223,163 | B1 | 4/2001 | Van Luchene |
| 6,233,564 | B1 | 5/2001 | Schulze, Jr. |
| 6,246,996 | B1 | 6/2001 | Stein et al. |
| 6,260,024 | B1 | 7/2001 | Shkedy |
| 6,260,064 | B1 | 7/2001 | Kurzrok |
| 6,269,343 | B1 | 7/2001 | Pallakoff |
| 6,298,331 | B1 | 10/2001 | Walker et al. |
| 6,308,160 | B1 | 10/2001 | Rex |
| 6,317,722 | B1 | 11/2001 | Jacobi et al. |
| 6,317,723 | B1 | 11/2001 | Walker et al. |
| 6,317,745 | B1 | 11/2001 | Thomas et al. |
| 6,321,202 | B1 | 11/2001 | Raveis, Jr. |
| 6,332,129 | B1 | 12/2001 | Walker et al. |
| 6,341,353 | B1 | 1/2002 | Herman et al. |
| 6,351,739 | B1 | 2/2002 | Egendorf |
| 6,356,879 | B2 | 3/2002 | Aggarwal et al. |
| 6,363,357 | B1 | 3/2002 | Rosenberg et al. |
| 6,411,936 | B1 | 6/2002 | Sanders |
| 6,411,940 | B1 | 6/2002 | Egendorf |
| 6,421,724 | B1 | 7/2002 | Nickerson et al. |
| 6,431,985 | B1 | 8/2002 | Kim |
| 6,446,044 | B1 | 9/2002 | Luth et al. |
| 6,466,914 | B2 | 10/2002 | Mitsuoka et al. |
| 6,477,504 | B1 | 11/2002 | Hamlin et al. |
| 6,477,509 | B1 | 11/2002 | Hammons et al. |
| 6,490,567 | B1 | 12/2002 | Gregory |
| 6,754,636 | B1 | 6/2004 | Walker et al. |
| 6,970,837 | B1 | 11/2005 | Walker et al. |
| 7,092,892 | B1 * | 8/2006 | Sobalvarro et al. ............... 705/5 |
| 7,117,166 | B2 | 10/2006 | Ifflander et al. |
| 7,177,836 | B1 * | 2/2007 | German et al. ................. 705/40 |
| 2001/0037230 | A1 | 11/2001 | Raveis et al. |
| 2001/0041988 | A1 * | 11/2001 | Lin ................................ 705/1 |
| 2001/0047280 | A1 | 11/2001 | Alexander et al. |
| 2008/0059329 | A1 * | 3/2008 | Luchene et al. ................ 705/26 |

OTHER PUBLICATIONS

McCarthy, Mike, "Lyon Realtors adds post-sales services", "Proquest #57653579", Jul. 28, 2000, pp. v17i20-3, Publisher: Sacramento Business Journal.

Home-Link: Hlotyak, Elizabeth, "1-stop home-buyibng online", Aug. 7, 2000, p. 3, Publisher: Fairfield County Business Journal.

Diehl, Michelle, "Home service provider networked with web site", "Proquest #48272980", Jan. 23, 2000, p. 3, Publisher: Richmond Time Dispatch.

HTTP://WWW.ELANCE.COM, "eLance: The world's largest professional services marketplace", Oct. 2001, p. 2, Publisher: www.elance.com.

Gilgoff, Henry, "It's your money, . . . ", "Proquest #44830127", May 10, 1998, p. 4, Publisher: Newsday.

HTTP://WWW.HOMESTORE.COM/MOVING, "#1 House and Home Network", Oct. 2001, p. 3, Publisher: www.homestore.com.

Meno:, "Directmoving.com announces its launch into the Middle East", "Proquest #95538865", Aug. 26, 2000, p. 2.

HTTP://WWW.MOVING.COM, "Moving.com: Find moving companies, real estate agents, mortgage companies & more", Oct. 2001, p. 3, Publisher: www.moving.com.

HTTP://WWW.YELLOWTRUCK.COM, "Welcome to Ryder TRS", Oct. 2001, p. 2, Publisher: www.yellowtruck.com.

* cited by examiner

FIG. 2C

FIG. 2D eMove

Step 1: Pick location & types of help you will need

You have booked your U-Haul equipment to

Move From | To
Los Angeles, CA | Phoenix, AZ

Your Pickup date is: | Your approximate arrival date is:
August 8, 2001 | August 10, 2001

Check help you need in "City 1"?
- ☐ Loading/Unloading
- ☐ Packing/Unpacking
- ☐ Carpet Cleaning
- ☐ House Cleaning
- ☐ Yard Work
- ☐ Painting
- ☐ Assembly/disassembly
- ☐ Other (please specify) _____

Check help you need in "City 2"?
- ☐ Loading/Unloading
- ☐ Packing/Unpacking
- ☐ Carpet Cleaning
- ☐ House Cleaning
- ☐ Yard Work
- ☐ Painting
- ☐ Assembly/disassembly
- ☐ Other (please specify) _____ make your move on eMove

*FIG. 3A*

FIG. 3B eMove | make your move on eMove

Step 3: Review each moving help partner | Stats for last 6 months

Userid: John # of yrs on eMove: 2 /312

Feedback Rating /310 /314 ***** 
Feedback Reviews 10 (See details)

Sevice Profile

| | |
|---|---|
| # of moves made: | 25 |
| Hourly Rate: | $ 15 |
| Policy: | See detailed Policy |
| Availability: | Tue-Sun/ 9:00 am - 9:00pm; |
| | Not available on Mondays |

316

Graphic

Hello, I am John-a student at the Phoenix Community College. I have helped customers move before and enjoy meeting new people. I am a member of the Phoenix Urban League & participate in Youth Soccer. I do everything from packing & loading to yard work & appliance assembly. Read my reviews to learn more about me

318

Select John's Labor /320

*FIG. 3C* make your move on eMove

Step 4: Schedule & Confirmation Process

Scheduled Pickup Time:

Aug 8, 2001; 8:00 AM

U-Haul Beverly Hills
2621 E. Indian School
Beverly Hills, CA-90210

Scheduled Drop Off:

U-Haul Hayden Road
Scottsdale Road
Phoenix, AZ-85281

Size of Truck:

14 Footer

Towing: None

— 322

Cancellation Policy: See Cancellation Policy

Schedule:

| August 2001 |   |   |   |   |   |   |
|---|---|---|---|---|---|---|
| S | M | T | W | T | F | S |
|   |   |   | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 |   |

| Wednesday August 8, 2001 | |
|---|---|
| 8:00 | |
| 9:00 | |
| 10:00 | |
| 11:00 | |
| 12:00 | |
| 1:00 | |
| 2:00 | |
| 3:00 | |
| 4:00 | |
| 5:00 | |
| 6:00 | |

— 324

Time Estimator:

Based on our estimates of moving times, we estimate you will need about 8 hours to accomplish what you've outlined in your request.

Click here to find out more about moving help estimator tools.

— 326

You indicated that you need the following help:

⌐ Loading & Unloading   ⌐ Carpet Cleaning

Please tell us how many hours of labor you wish to purchase? _____ hrs

How many "moving help partners" will you need? _____

CONFIRM

*FIG. 3D* make your move on eMove

Step 5: Payment Screen

Thank you for choosing John's Labor. Please verify all information.

Number of Hours Purchased: 8

Type of Moving Help Requested:
☒ Loading & Unloading  ☒ Carpet Cleaning

Total Estimated Cost: $120 ⟩—328

Please enter your Credit Card Information & Expiration Date

Please enter a mobile/pager you can be reached at: _____ ?

Here is your confirmation number: S V 8 3 4 T R ⟩—330

*Keep this confirmation code very carefully. Giving this number over to the vendor will allow the vendor to be able to charge your credit card for the above amount. Please note that these funds will be held in escrow until the services are rendered satisfactorily. Any questions, send email to customerservice@uhaul.com*

Please do visit us back and fill out the customer review section. IT is very important that you review your moving help partner. Your feedback allows us to establish a quality service for your moving customers.

Click here to Complete Purchase

Scheduled Pickup Time:
Aug 8, 2001; 8:00 AM

U-Haul Beverly Hills
2621, E. Indian School
Beverly Hills, CA-90210

Scheduled Drop Off:
U-Haul Hayden Road
Scottsdale Road
Phoenix, AZ-85281

Size of Truck:
14 Footer

Towing: None

*FIG. 4*

ONLINE MARKETPLACE FOR MOVING AND RELOCATION SERVICES

RELATED APPLICATION

This application is a divisional of and claims the priority of U.S. Non-Provisional patent application Ser. No. 10/083,726, filed Oct. 19, 2001, now U.S. Pat. No. 7,487,111 entitled "Online Marketplace for Moving and Relocation Services," which is incorporated herein by reference.

BACKGROUND

1. Field of the Invention

The present invention relates generally to customer/vendor marketplaces in a computer network environment. More specifically, the invention relates to an online marketplace for customers and vendors to transact business for services and goods, including those related to moving, and allows for pre-payment for the services and goods.

2. Discussion of Related Art

For many years, the Internet has allowed consumers of a wide variety of goods to get online and meet merchants and retailers. There are many models in which transactions between buyers and sellers of products or goods can take place. Companies in this space include some well known names such as Amazon, eBay, Priceline, Mercata, among hundreds of others. The models for such transactions include fixed prices, peer-to-peer bidding, volume purchasing, and bid and lock models. These models, as well as others, have been used for many years in the online world and have been widely successful.

However, similar models for selling services on the Internet or in online marketplaces are still evolving and have not yet had widespread acceptance. Presently, there are numerous online companies that provide marketplaces for customers and service providers, referred to as vendors, to transact business. An example of one such company is eLance which provides a shared workplace for its members who pay subscription and transaction fees. Members, e.g., a customer can bid for a service or can pay a fixed price for a service offered by a vendor. The customer and vendor then collaborate in a shared workspace. At Guru.com, customers can hire freelance vendors in a non-fee marketplace. Others include Sologig.com where freelancers can be hired for a fee and Servicemagic.com where service providers, such as plumbers, landscapers, and the like, pay a fee to bid on jobs posted by customers.

Many of the online marketplaces for services have not focused on a specific area of business. Most, if not all, service-oriented online marketplaces have taken a general character, supplying a wide variety of services in different fields without focusing on a particular business. One example of a business space that is primarily service oriented is the self-help or "do-it-yourself" moving business. In this business a customer rents a truck, trailer, or van to move their personal possessions to a new location instead of hiring a full service moving company to pack, load, unload, and transport the possessions. The Ryder Corporation, a transportation management and vehicle rental company, has a web site at Ryder.com or yellowtruck.com which allows customers to obtain information on vehicle rentals and other transportation needs. The customer can rent a vehicle and request that a service provider contact the customer in the future to enter a transaction.

The do-it-yourself moving business typically has as its primary or originating transaction between customer and vendor the renting of a van, truck, or trailer. A customer begins a move by renting a vehicle or trailer at one location and returns the vehicle at a different or same location. Often when moving, the customer may seek help for a wide variety of services. The most apparent being loading and unloading the vehicle or trailer. Customers may also seek help with packing and unpacking and with other common chores that need to be done when moving, such as housecleaning, painting, yard cleaning, garbage/waste removal, carpet cleaning, and so on. The list also includes less obvious items such as reserving a hotel room at the destination for the night before moving in and similar services at the destination, such as unloading, removal of empty boxes, cleaning, assembling furniture, and so on.

Presently, customers seek moving-related services by searching the yellow pages and classifieds or asking for referrals at the moving equipment rental office, where employees are not generally permitted to provide such information. The task of finding all the services a do-it-yourself moving customer may need becomes time consuming, inefficient, and disjointed. In addition, customers are typically left to choosing a vendor randomly from yellow page listings or classified ads. Customers seeking services or a vendor in a city or location different from where they live face the problem of getting information on the remote location. Obtaining such information from online yellow pages can be problematic or difficult for certain customers. In some cases customers go to Internet web sites for moving services, such as moving.com or move.com. These sites allow customers to access information and contact information of vendors regarding moving services and goods. The sites are enhanced online yellow page listings for moving services and goods. The customer can access information on moving, such as moving tips, money saving ideas, and the like. In some cases a customer is linked to one vendor for a particular service or good as opposed to a listing of vendors along with information on rates and customer feedback. A customer visiting these sites is typically not able to transact business or make a purchase on the sites. Customers are not able to hire a vendor and pre-pay for the vendor services at the site. They are generally informational. Many of the vendors, such as those who offer the service of loading and unloading or provide housecleaning services, have minimum time or payment requirements. That is, the minimum that the customer must pay is dictated by the vendor, regardless of the level of need of the customer. For example, a student moving from shared housing to a studio will likely have to pay a vendor a minimum payment that exceeds the services actually needed by the student. The experience of moving is often not a pleasant one and calls for many disparate tasks apart from the basic job of transporting one's possession. Some of these varied tasks, if not brought "under one roof" may be overlooked and require a quick fix at the last moment. Online sites for making reservations for a truck, van or trailer for the do-it-yourself moving customer have gained widespread acceptance. Customers routinely log on to the site and make more informed decisions on what type of moving equipment, truck size, and so on they may need. However, making arrangements for the varied services related to a move are not available at the same site despite the fact that such services, as noted above, are integral to moving and relocating.

SUMMARY OF THE PREFERRED EMBODIMENTS

Methods and systems for operating an online marketplace for the sale of services and goods associated with do-it-yourself moving and relocating are described. In one aspect of the invention a method of providing auxiliary services in a computer network marketplace associated with an originating transaction between a customer and a host is described. An originating or primary transaction, such as reserving a truck, van or trailer through an online reservation system is processed after a series of screen shots prompts the user for input. The input is used to make a reservation in the name of the customer for moving equipment, typically a truck, van or trailer, dollies, etc., and is processed by a host reservation system. The customer has the option of entering an online or computer network marketplace where content describing an auxiliary or secondary service relating to the originating transaction is presented to the customer. The customer initiates a secondary transaction between the customer and a service provider for the auxiliary service. The service provider is listed at the online marketplace at the discretion of the host or marketplace operator. The transaction processing between the customer and the service provider, or vendor, is expedited using input provided by the customer for the originating transaction for the renting of the moving equipment.

In one embodiment, the host of the online marketplace accepts a payment from the customer for the service at the time the customer is reserving the service. This payment is stored in an account and is not given to the vendor until the service is completed. The online marketplace presents vendor information to a customer and allows the customer to select a vendor that best suits the customer's needs, thereby shifting to the customer control of the transaction between the customer and vendor. In another embodiment of the secondary transaction is initiated upon completion of the originating transaction. In another embodiment, the auxiliary services include loading/unloading services, packing and unpacking services, housecleaning, landscaping, carpet cleaning, painting, and garbage removal services. In another embodiment the auxiliary services include hotel reservation services.

In another aspect of the invention, an online marketplace implemented on a computer network, such as the Internet, is described. The marketplace allows do-it-yourself moving customers and vendors offering services in the moving and relocating fields to enter into transactions. The online marketplace is comprised of a customer application, a vendor application, and an administrative application. The customer application processes input entered by a customer once the customer has entered the marketplace, the customer input including in particular a pre-payment for a service transaction between the customer and a particular vendor, wherein the pre-payment is held in an account. The vendor application processes input entered by a vendor offering a moving related service. One example of the vendor input includes a confirmation code to activate transfer of funds from the account to a vendor account. An administrative application allows a marketplace host to maintain the marketplace and gather transactional data from the customer application and the vendor application.

BRIEF DESCRIPTION OF THE DRAWINGS

FIGS. 2C and 2D are screen shots of a user interface for a reservation system in which a customer is requested to select specific rental equipment.

FIG. 3A is a screen shot of a user interface offering moving and relocation services.

FIG. 3B is a screen shot of a user interface showing a list of vendors for general moving help in two locations.

FIG. 3C is a screen shot of a user interface presenting to a customer information regarding a selected vendor.

FIG. 3D is a screen shot of a user interface in which a customer can enter scheduling information, estimates of the work needed, and confirm the service.

FIG. 4 is screen shot of a user interface in which a customer is provided with a summary of the service, confirmation code, and is given the opportunity to complete the transaction.

DETAILED DESCRIPTION OF THE PREFERRED EMBODIMENTS

Figure 1A:
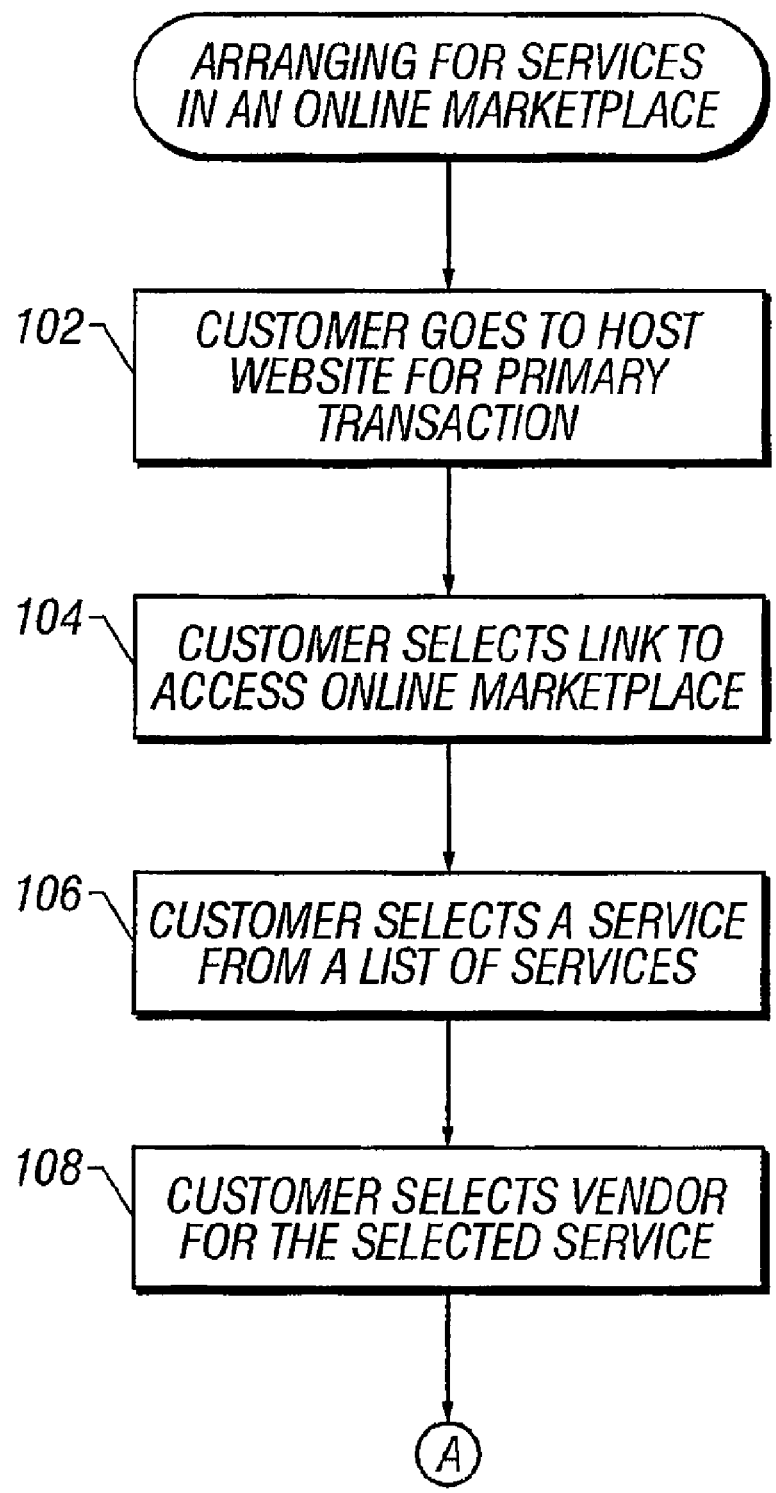
FIGS. 1A, 1B, and 1C are flow diagrams of a process in which a customer arranges for auxiliary moving and relocation services in an online marketplace in accordance with a preferred embodiment of the present invention.

Reference will now be made in detail to preferred embodiments of the invention. An example of a preferred embodiment is illustrated in the accompanying drawings. While the invention will be described in conjunction with the preferred embodiments, it will be understood that it is not intended to limit the invention to the preferred embodiments. To the contrary, it is intended to cover alternatives, modifications, and equivalents as may be included within the spirit and scope of the invention as defined by the appended claims.

The present invention is a process and system of an online or computer network marketplace where do-it-yourself moving customers enter into transactions with vendors offering moving-related services and a wide variety of services typically needed when relocating. A customer is able to enter the online marketplace either by performing an originating or primary transaction, e.g., renting a moving truck, van or trailer, or by-passing such an originating transaction and directly entering the online moving and relocation services marketplace. The online marketplace of the present invention is beneficial to vendors offering moving-related and relocation services because the online traffic at the web site hosting the marketplace is composed almost entirely of customers who are in the process of moving or planning for a move. Thus, by harnessing this unique traffic, the marketplace operator or host (e.g., a moving equipment rental company) can cross-sell services often needed by its customers. By offering customers to the online marketplace a list of vendors for these services and overseeing initial contact between customer and vendor, the marketplace operator/host can directly benefit economically and, moreover, can build greater goodwill in the minds of its customers who initially came to the site to rent moving equipment.

As noted, when people move they inevitably need various types of services: housecleaning, painting, waste removal, yard cleaning, "handyman" type work, carpet cleaning, disassembly/assembly of furniture, and loading/unloading. Some of these services, for example, carpet cleaning or waste removal, may not be immediately apparent to those moving who may be preoccupied with larger issues. If a marketplace operator can institutionalize the process or behavior of customers in obtaining these services at the time of the move, all parties involved in a transaction—operator/host, customer, and vendor—will benefit. Furthermore, if the online marketplace enables a shift in control with respect to the amount or level of services needed from the vendor to the customer, customers will benefit without necessarily harming the economic opportunities of the vendors. Customers may be more likely to order services that they may not have thought of absent the online marketplace if they 1) have more control over how much they spend on the service; 2) are provided with a comprehensive menu or list of such services and qualified vendors for those services; 3) can order such services while making reservations for moving equipment; and 4) can view feedback on vendors from previous customers. In a preferred embodiment, the customer is required to provide feedback on a particular vendor to the host upon completion of the service by that vendor. This allows the host to provide more useful rating and feedback to future customers when selecting a vendor and further provides for the shift in control over a transaction from the vendor to the customer.

An online marketplace would allow customers to estimate the amount of labor they would need by having customers answer a series of queries about their move. In a preferred embodiment, the customer will be provided with an estimate for all the services requested and can pre-pay for the services using a credit card or other payment means. The marketplace can provide lengths of time a particular vendor has taken in the past to do a particular task. The customer can use this to estimate how many hours they will need. The amount paid is kept in an account arranged by the marketplace operator with the assistance of a third party service provider, such as PayPal, an online cash transferring service. Once the service is completed, the amount owed is deducted from the account and paid to the vendor. The marketplace operator is also paid a predetermined amount from the account for providing the marketplace services. Any excess funds are returned to the customer. In a preferred embodiment, an example of one of the marketplace services includes investigating identification information of each of the vendors to ensure that the contact information a vendor is providing is valid. The marketplace operator may use a third-party service provider for this task such as Experian or Equifax, companies that verify identification and contact information. Validating information provided by a vendor wanting to be on a list of vendors would likely provide customers with the desired assurance that the customers will be doing business with legitimate vendors. The marketplace operator can also take steps to ensure that the vendors are reputable, have a presence in a community, or have specialties in certain areas. These features are described in greater detail below.

Figure 1B:
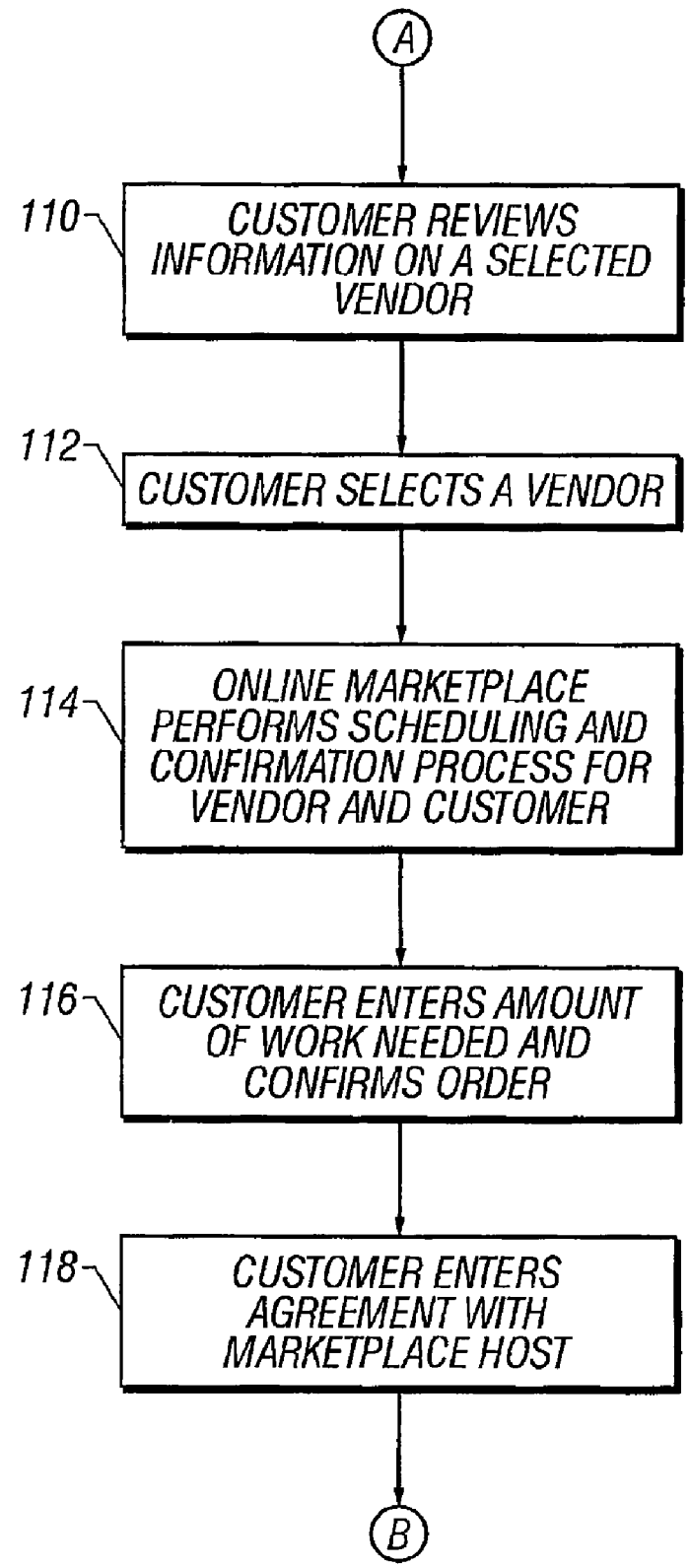
Figure 1C:
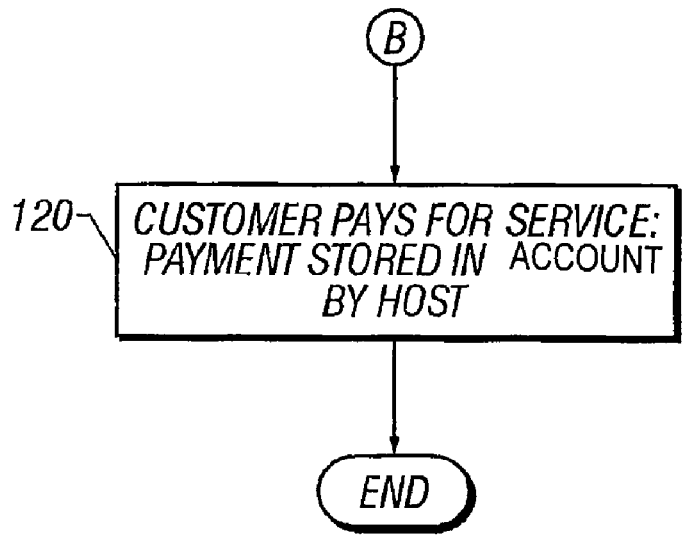
Figure 2A:
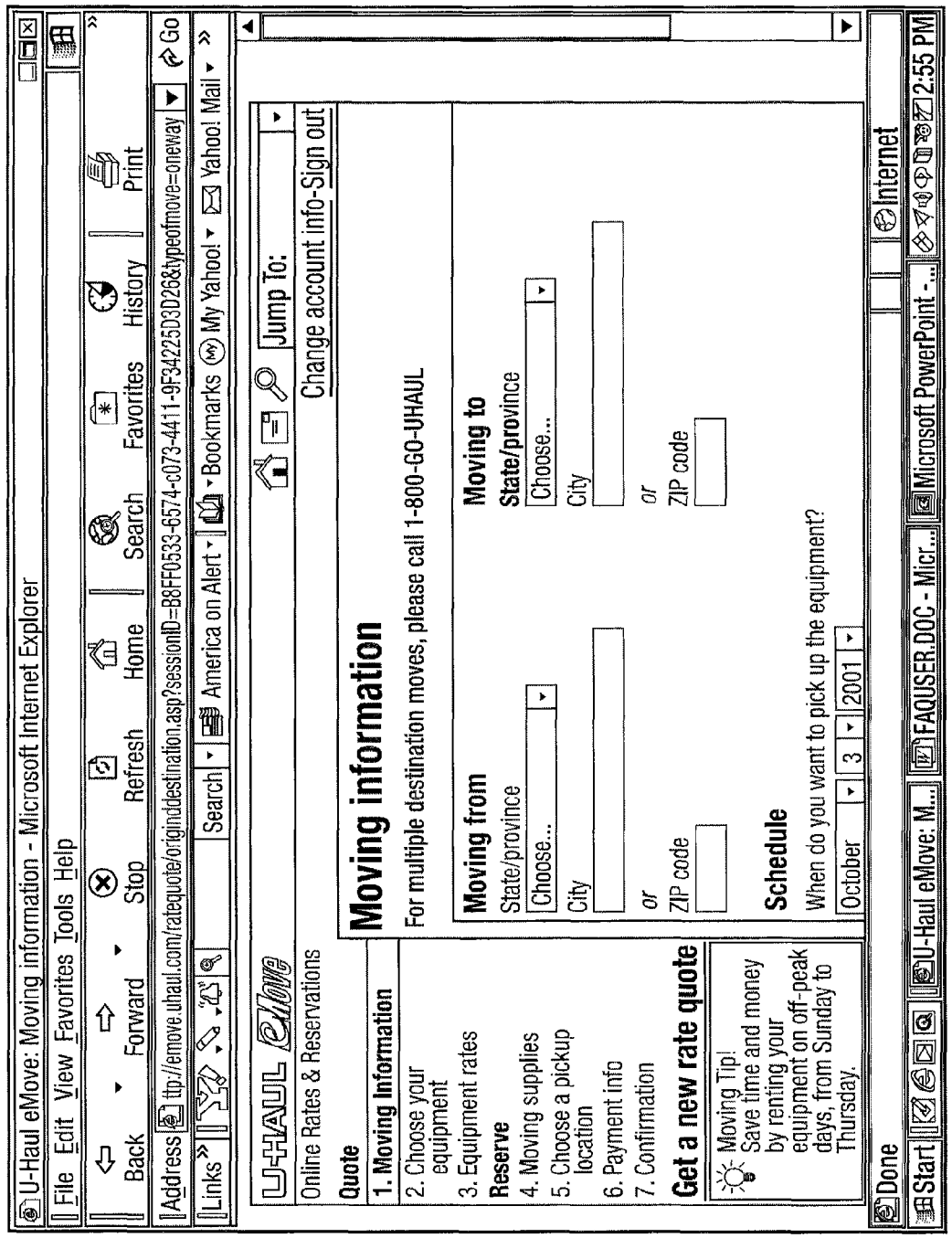
FIG. 2A is a screen shot of a user interface for a reservation system in which basic moving and rental information is requested from the customer.
Figure 2B:
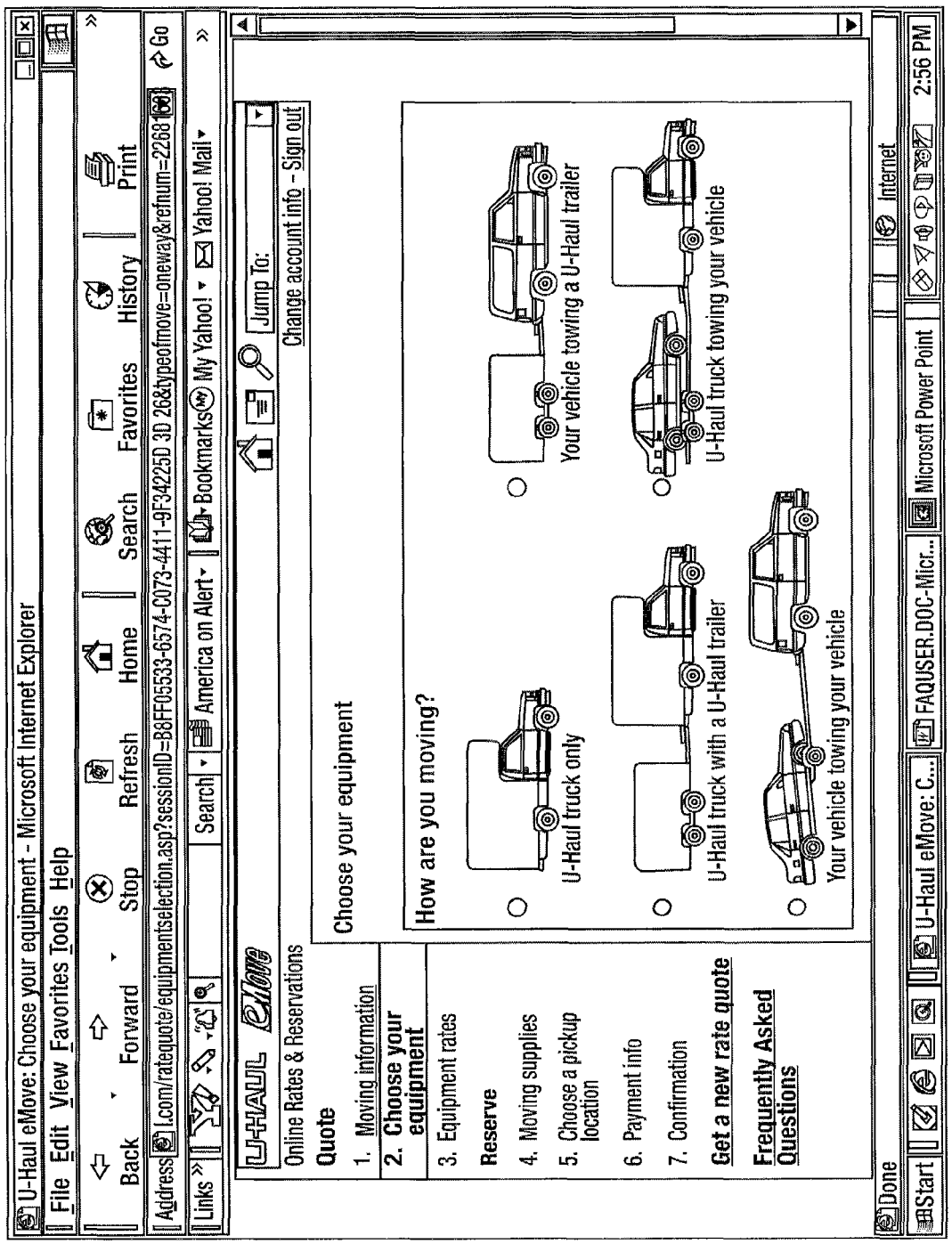
FIG. 2B is a screen shot of a user interface for a reservation system in which a customer is requested to select the type of equipment to be rented.
Figure 2C:
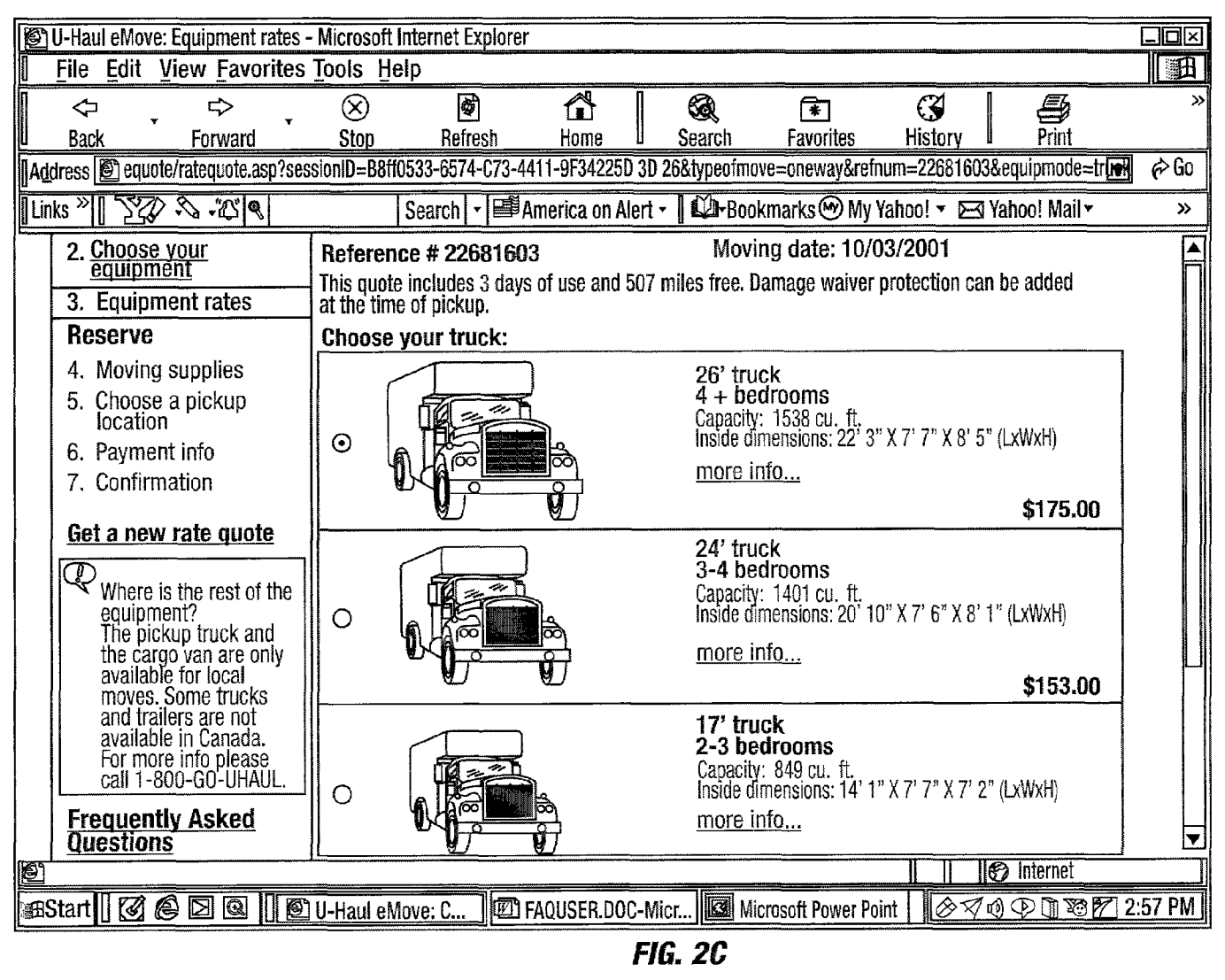
Figure 2D:
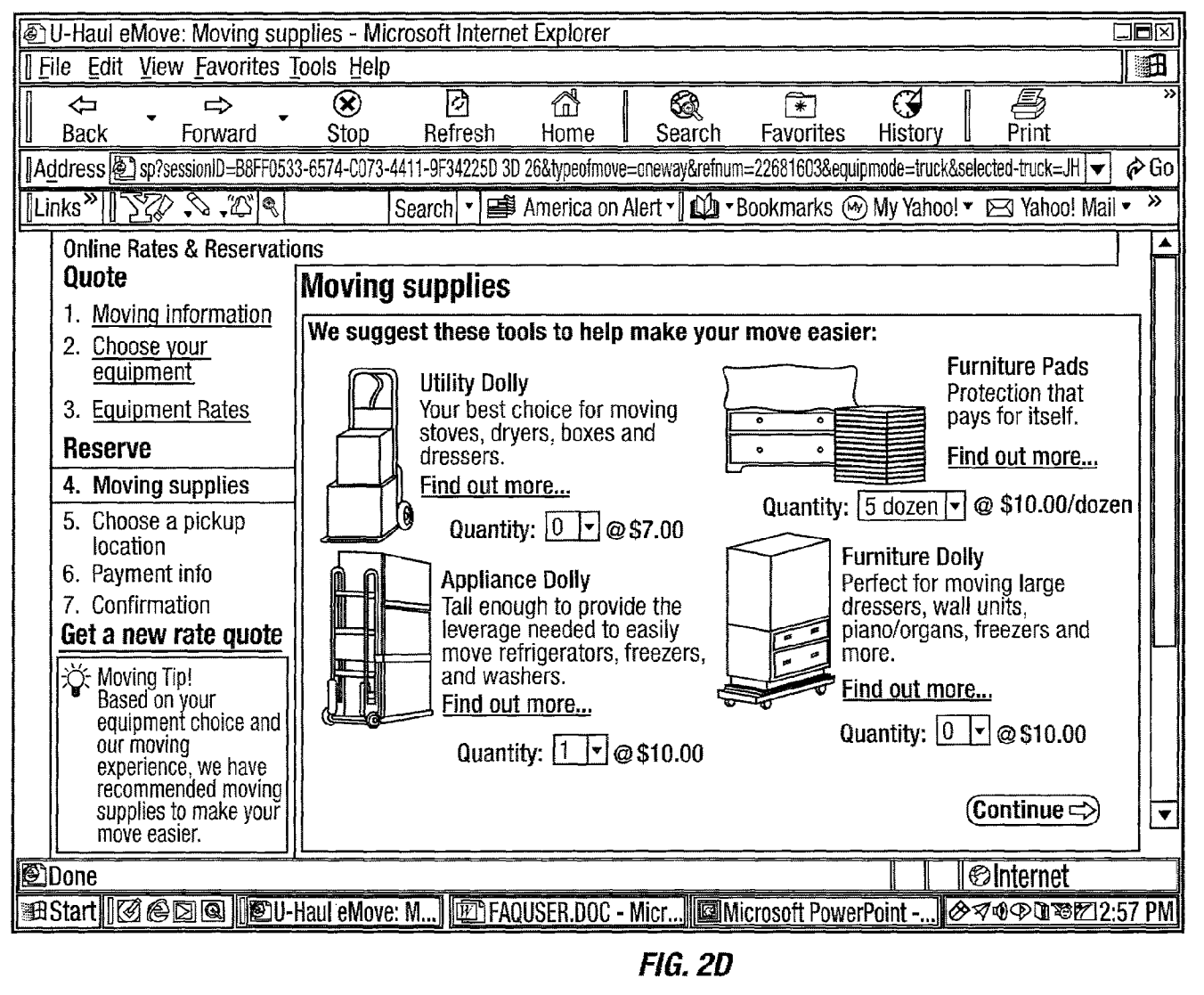

FIGS. 1A, 1B, and 1C are flow diagrams of a process in which a customer arranges for auxiliary moving services in an online marketplace in accordance with a preferred embodiment of the present invention. At step 102 of FIG. 1A, the customer visits the marketplace operator or host web site with the initial goal of reserving equipment for moving. In most cases this means renting a truck, van, trailer, or towing equipment. The customer enters information regarding dates the equipment will be needed and the pick-up and drop-off locations. An example of the screen shot displaying the fields used to capture this information is shown in FIG. 2A. FIGS. 2B, 2C, and 2D are screen shots of a user interface where the user can choose specific equipment for moving. In FIG. 2B, the customer is asked how he is moving and is provided with various options. To follow one example, if the customer chooses a truck, he is presented with FIG. 2C, a screen shot where the customer chooses the size of the truck and is given estimates how much can be moved in different sizes. FIG. 2D is a screen shot where the customer can rent moving supplies.

Figure 2E:
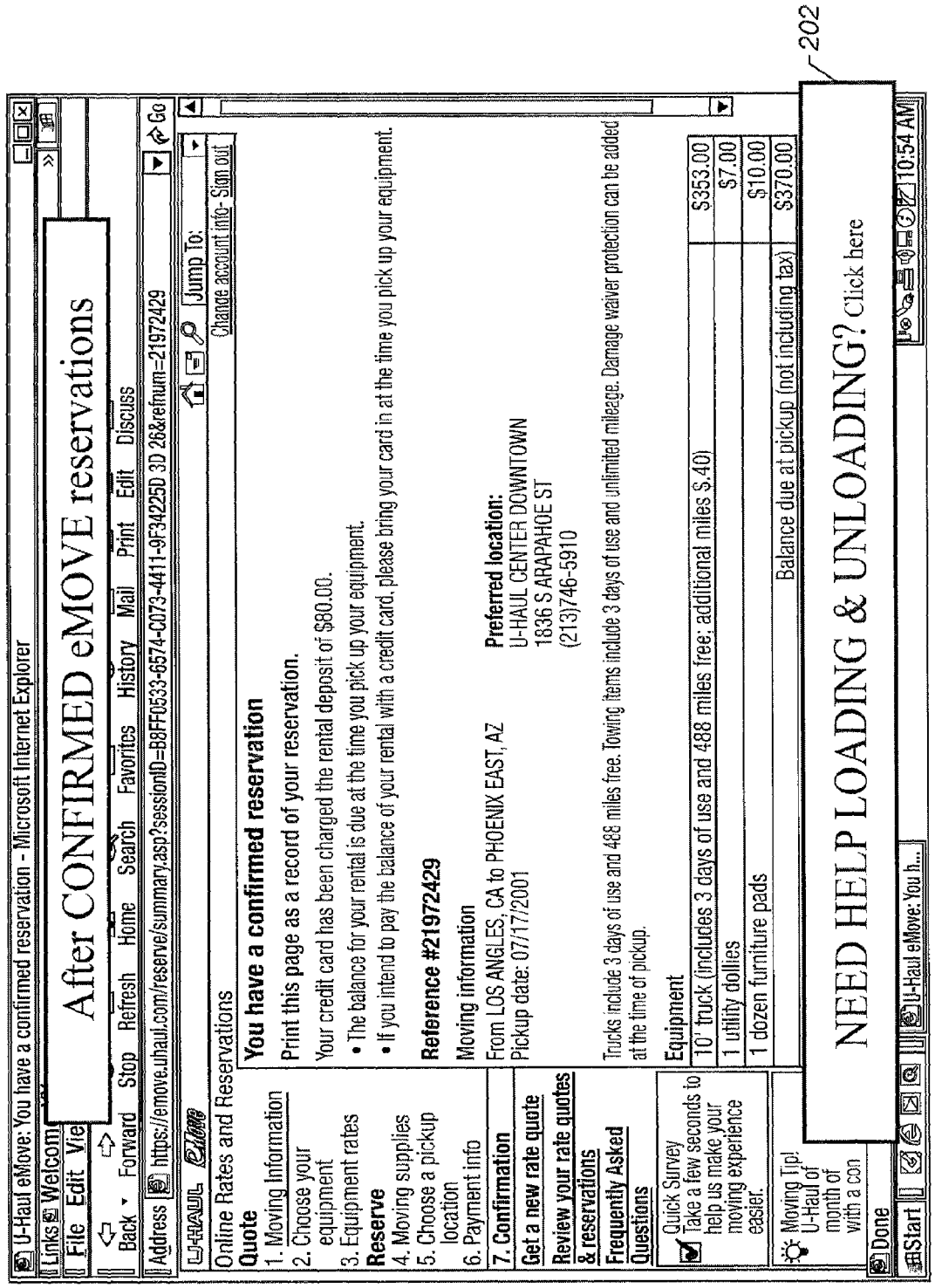
FIG. 2E is a screen shot of a user interface for a reservation system in which a confirmation is presented to the user and the user is able to seamlessly enter an online marketplace.

FIG. 2E is a screen shot showing a confirmed reservation and related information. At this stage the customer has completed the primary or originating transaction for which he visited to the host web site. He has reserved moving equipment and moving supplies for a specified length of time and specified pick-up and drop-off locations. At this stage, the customer has also entered personal information such as address, phone number, and so on. The customer has also made a deposit to hold the reservation using a credit card.

Once the originating transaction is complete, the customer can begin thinking of auxiliary services he may need related to his move. At step 104 the customer selects an icon or link to access an online marketplace for moving services. This icon or link can take various forms. In a preferred embodiment, the icon is used to get the attention of the customer by offering a service the customer is most likely to need. In FIG. 2E this icon is box 202 containing the text "NEED HELP LOADING & UNLOADING? Click here". In another preferred embodiment, the icon can display other text such as "FIND A SERVICE PROVIDER IN YOUR AREA TO MEET YOUR MOVING NEEDS" or similar messages.

Once the customer has clicked on icon 202, the customer has entered an online marketplace where he can choose auxiliary services needed for the move. At step 106 the customer selects services from a list of services available in the marketplace. These services include packing/unpacking, loading/unloading, carpet cleaning, furniture assembly, pool maintenance, auto mechanic services, computer maintenance, house cleaning, yard work, landscaping, real estate services, nails, messaging services (e.g., GPS), babysitting services, home improvement services, doctor referrals, lawyer referrals, school information, pet care providers, job searching services, neighborhood analysis, utility/phone connection, utility/phone connection services, long distance/cable services, handyman services, hairdressing services, and other services. An example of a screen shot offering typical services is shown in FIG. 3A. In a preferred embodiment, the customer completed an originating transaction, in this case renting moving equipment. Information regarding this transaction is shown in area 302. In other embodiments, the customer may not have an originating transaction and may directly enter the online marketplace in which case the customer may be prompted to enter which location or locations he will need the services. If he enters two locations, he will be presented with information as shown in area 304. The customer selects a service from lists 306. If the customer is moving within one city or community, one list will be displayed.

Figure 3B:
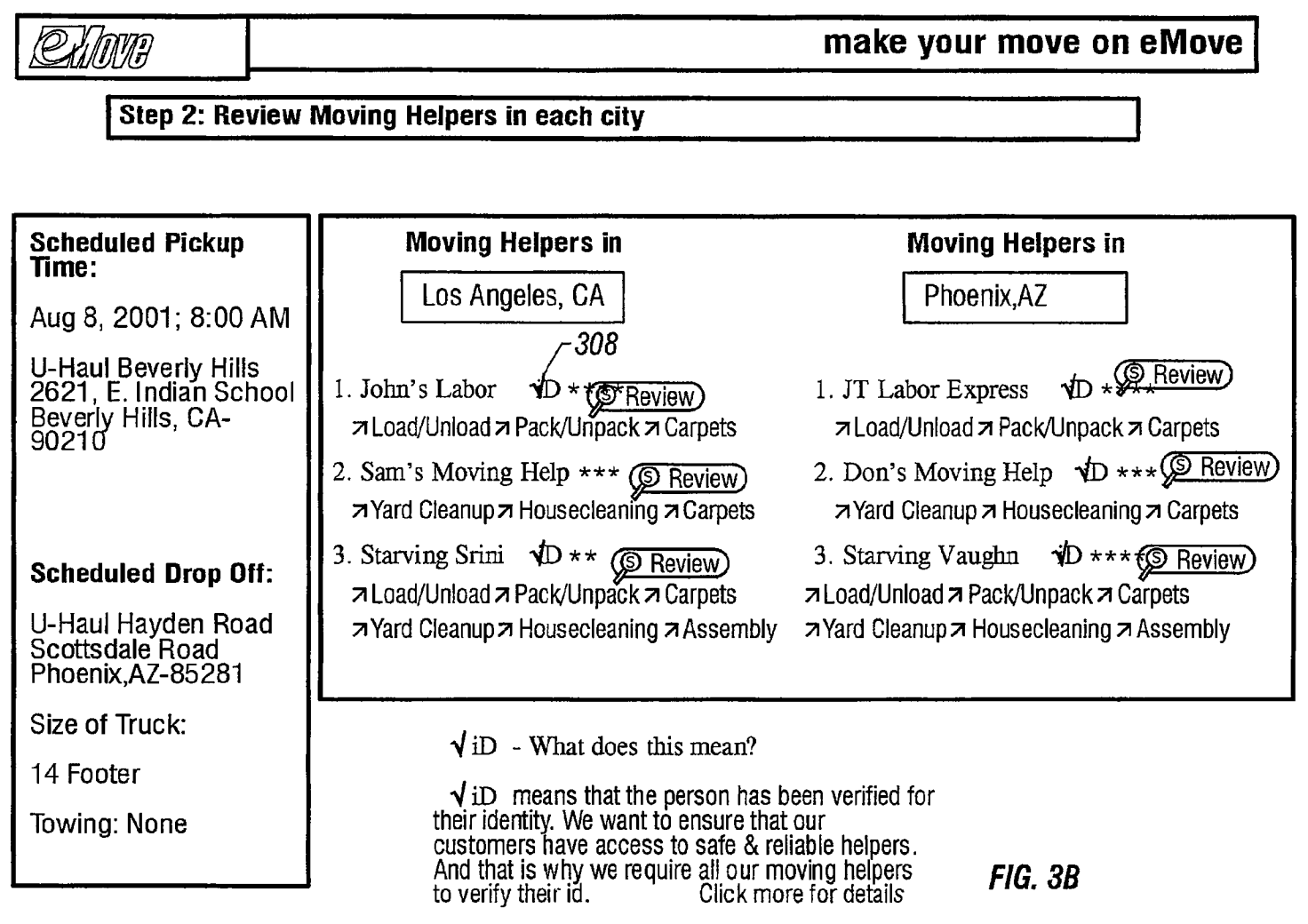

After selecting a service in step 106, at step 108 the customer selects a particular vendor for the selected service. FIG. 3B is an example of a screen shot showing a list of vendors for general moving help in two locations. A symbol 308 indicates that a vendor's identity has been verified by the host. As noted above, the host may use a third party service to verify the vendor's identity and contact information such as Experian, Inc or Equifax.

At step 110 the customer learns more about a particular vendor by clicking on the vendor listing. An informational screen such as shown in FIG. 3C is presented to the customer in which information such as a vendor rating 310 based on previous customer feedback and number of years listed 312 is provided. The customer can also view previous reviews 314 of the vendor. At area 316 some basic information on the vendor, such as rates and policies, is provided, as well as graphics such as a logo or photo of the vendor or a streaming video clip prepared by the vendor. At area 318 the vendor can provide personal or biographical data to prospective customers. Informational items 310 to 318 are intended to acquaint prospective customers with a vendor and make customers more comfortable in dealing with a particular vendor. It also allows the vendor to highlight aspects of their business that may appeal to customers. In other embodiments, the form, presentation and layout of this information may be different but the objective remains the same. In addition, in a format such as this where a customer selects the service and vendor based strictly on the needs of the customer, control over the terms of the transaction shifts from the vendor to the customer. Typically, the vendor dictates the terms, rates, and conditions of the service transaction and arrangement. With this process, the customer can now find a vendor he is comfortable with and select one that has an hourly rate or flat rate that fits within the customer's budget. In another preferred embodiment, the customer can post a proposal or request for a service and provide the parameters such as price, location, amount of time, dates, and so on. This is useful if there are hundreds of listings for a particular service and the customer is having difficulty selecting from the list and would rather have vendors come to him.

At step 112 the customer selects a vendor. This is done after reading the vendor information and by clicking on an icon 320 displayed at the bottom of FIG. 3C. The customer can also select a vendor directly from the lists shown in FIG. 3B. Once a vendor has been selected, the customer is taken through a scheduling and confirmation process based on customer input at step 114. The customer and vendor can also interact on a message board before confirming a transaction, described in step 116. FIG. 3D is a screen shot of a display where a customer schedules the selected service and confirms the service. Scheduling and cancellation information is entered in area 322. In a preferred embodiment the host will provide the customer with an estimate of the time the customer will likely need for the particular service. This can be done using information entered to reserve the rental equipment, such as truck size, size of household, and so on. Information on the estimate of the number of hours or, more generally, the units of labor the customer will need to complete the service is provided in area 324. The host can derive estimates by assimilating historical, previous customer data and feedback, and by using expertise in the moving business it has gained over the years.

At step 116 the customer enters the number of hours of labor he wants to reserve and confirms the order. This is done in area 326. The customer can use the estimate provided by the host to enter this information. Again, the customer has control over how many hours he believes will be needed for the job. Thus, if he believes only one hour of labor will be needed he can find vendors that do not have the typical minimum requirements of two hours of labor or similar restrictions. The customer can also learn more about the vendor by going through the process described above than can be learned by simply looking in a newspaper classified section or the yellow pages, which are the most common methods of finding vendors. In addition, the customer can examine reviews provided by previous customers, pre-pay for services using the account, and access listings in other geographic areas.

Once the customer has entered the amount of time he will need for the service, he is presented with a user agreement regarding the use of the marketplace, fees, and transaction guidelines at step 118. A customer need not enter into an agreement if he is only viewing content and browsing; it is only when he is going to enter into a transaction with a vendor that a user agreement is necessary. This user agreement addresses the rules of using the marketplace and is between the customer and the marketplace host, and not with the vendor. In a preferred embodiment, the online marketplace requires that a customer enter into a user agreement before transacting with vendors. There is one agreement between the host and the customer and another type of agreement between the host and the vendor. For each agreement, the executing party, i.e., the customer or the vendor, must electronically sign certain key provisions in the agreement or all the provisions. Unless the customer initials each provision for which an initial is requested, the customer will not be able to enter into the agreement. If he clicks the "I Accept" key or similar icon, an error message is returned.

At step 120 the customer pays for the service using a credit card or other form of acceptable payment. An example of a payment screen is shown in FIG. 4. A total estimated cost 328, in this case $120, is displayed to the customer based on information entered in previous screens. The customer is also provided with a confirmation code 330 which is kept confidential by the customer. This confirmation code is provided to the vendor by the customer once the service is completed and the customer is satisfied with the work. If the transaction is for goods, rather than services, the customer can provide the confirmation code to the vendor after delivery of the goods. The vendor uses the confirmation code, which acts as a key, to access an account from which the vendor is paid. The host also receives its fee for operating and managing the marketplace and serving as a digital clearinghouse.

As mentioned above, in a preferred embodiment, the customer pre-pays the full or partial amount of the services, as best estimated by the customer with the assistance of the host, as shown in areas 324 and 326 of FIG. 3C. The amount paid by the customer is transferred to an account maintained by a third party, such as PayPal or a host party's borrowing partner. Once the service has been completed, the vendor is paid directly from the account. If there are any disputes regarding the service or payment, the funds are held in the account until the dispute is resolved. The host can provide its own dispute resolution services or can use the services of a third party provider. By having such a service, the funds can be kept secure in the account until the dispute is settled. The vendor can use confirmation code 330 to access the account and obtain payment. In the preferred embodiment, the vendor must have an account or be a customer of the third party service selected by the host. For example, if PayPal is the third party service chosen by the host, the vendor must have an account with PayPal in order to receive payment from a PayPal business account. In the preferred embodiment, the vendor logs onto the host site and accesses a restricted area on the site intended for vendors only. There the vendor enters the confirmation code and thereby releasing the funds from the account to the vendor's account. At the same time, a certain amount is released to a host account for the host's services. Once the customer has made a payment to the account, the process of obtaining a vendor is complete. Although the process has been described for one vendor, it can be used multiple times to purchase or reserve services from different vendors or multiple services from a single vendor.

In another preferred embodiment, the customer does not pre-pay for the service as described above. The customer pays the vendor directly when the service has been performed. In this embodiment, the customer may pay a fee to the host for providing the marketplace service, similar to a referral fee. Similarly, the vendor may pay the host for listing the vendor in the marketplace, essentially a flat fee for the listing. The fee covers expenses for operating the online marketplace, maintaining the platform, acting as a clearinghouse for transactions, providing dispute resolutions service, and so on. In another preferred embodiment, the host collects the fees after the transaction is completed with the vendor. In this scenario there is no pre-payment; the customer pays the full amount at the end of the transaction. Regardless of the revenue model, the goal of the online marketplace does not change. Customers of the host, e.g., those interested in renting a truck or trailer for moving, are provided with a convenient, seamless process of making arrangements for related, useful services. Providing this marketplace is a convenience for the customer and thus enhances the goodwill of the host or the moving equipment rental company, in addition to providing an additional revenue source from which all parties can benefit. The seamless nature of the marketplace as it relates to the rental aspect of the host's site makes it conducive for customers to order services in the marketplace since a customer does not have to leave the host site. In another embodiment, the marketplace is hosted at a site different from the host site but the link to the marketplace site from the originating transaction site keeps the process of obtaining services seamless.

Over time, the online marketplace will accumulate data and track the buying habits of previous customers so it can make more accurate estimates of the amount of time needed for customers having similar characteristics, such as location, volume, and so on. The host can also make useful recommendations to customers based on what previous customers have done. For example, a customer renting a 10 foot truck may need about 2 hours of moving help, or the average vendor wage in New York City is $50 per hour. In another example, a customer loading a 26 foot truck in Phoenix will need about 5 hours as opposed to 8 hours in New York City because of extra steps.

The online marketplace of the present invention provides other benefits and revenue streams to the host. As described, the host is in the "do-it-yourself" moving business and may have developed a significant amount of goodwill and brand recognition amongst the public for the goods and services it provides. This goodwill and brand name recognition will draw a high volume of customers planning a move to the online marketplace. Thus, the marketplace attracts qualified customers in that a customer at the site is likely to have a strong propensity to buy certain services. These services can be those that are not suitable for listing in the marketplace itself. For example, a real estate agency or mortgage loan company may be interested in advertising on the marketplace since they will be directing their ads to a relatively specific audience, namely, those thinking of moving or in the process of moving. Another example is advertising medical and dental services since customers may need such services after moving to a new community. Other examples include services not directly related to moving such as babysitting services. The types and number of advertisers can vary greatly but the underlying concept and revenue model remains the same. That is, the online marketplace can be used to advertise relevant goods and services to a qualified audience.

The host can determine what type of vendors will be listed in the marketplace. The qualifications of a vendor can be examined on a case-by-case basis or general thresholds can be set in order for a vendor to be listed on the site. For example, a host can list a college student with a good reputation in the community for loading and unloading but who may not have a significant volume of business or it may choose to list an individual who has been housecleaning in a certain area for many years and comes recommended. Alternatively, the host can list only companies or businesses that are of a certain size and do a certain amount of business annually. The manner in which vendors are selected is a determination left to the host. The host can also remove vendors from the marketplace based on criteria decided solely by the host. A vendor can be removed from the list by the host based on feedback from the customer or any of a number of other factors.

Figure 5:
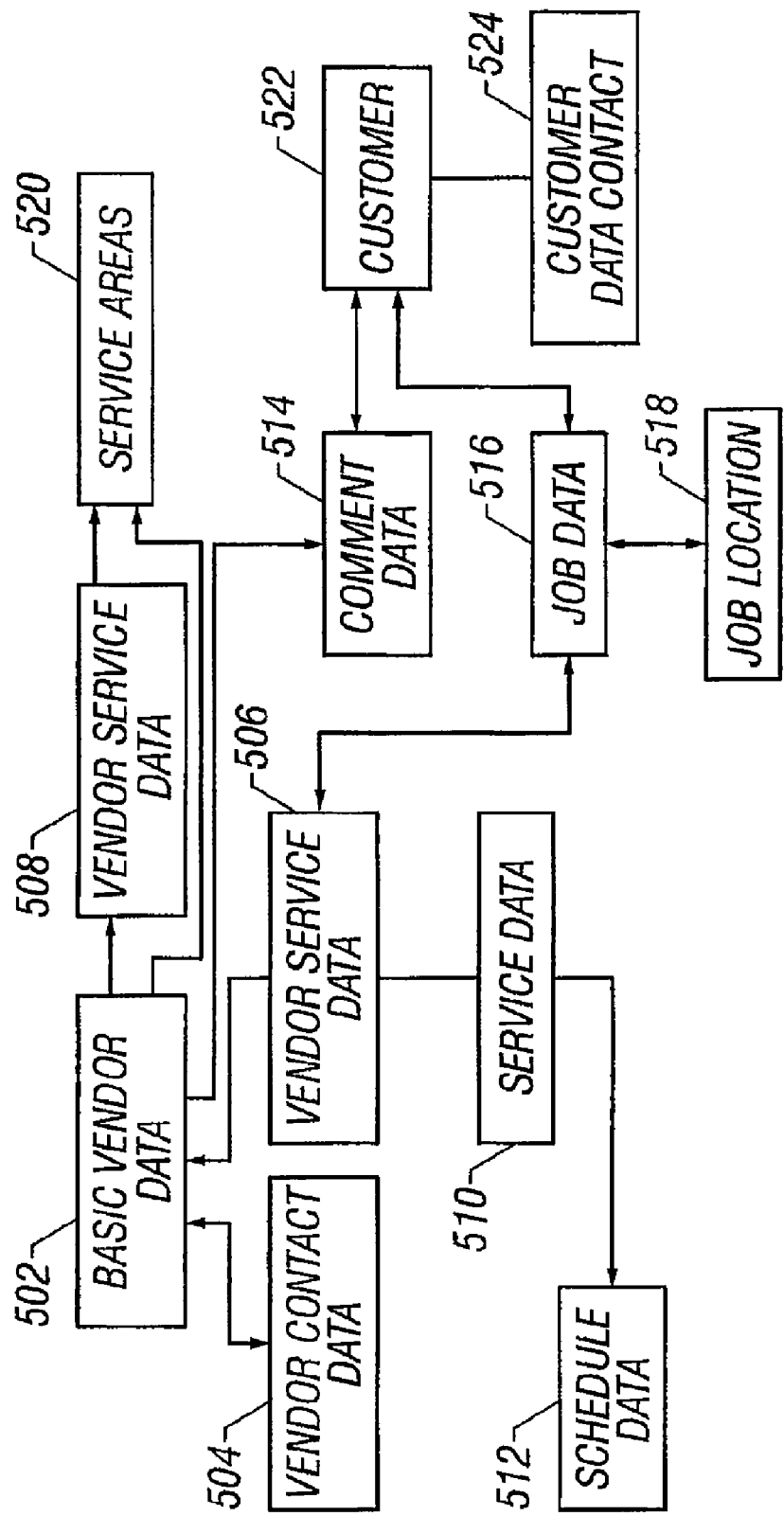
FIG. 5 is a block diagram showing various tables of data and their relationships in accordance with one embodiment of the present invention.

The online marketplace of the present invention is implemented by various types of data and applications. The data is organized in the form of groups or tables. FIG. 5 is a block diagram showing various tables of data and their relationships in accordance with one embodiment of the present invention. Information regarding a specific vendor is stored in four separate tables: Basic Vendor Data table 502, Vendor Contact Data table 504, Vendor Service Data 506, and Vendor Service Areas 508. Table 504 contains data for identifying and contacting the vendor, such as address, social security number, cell phone number, and similar information. Table 502 contains other information such as a brief description of the vendor, status, password, photo URL, vendor ID, how long it has been a member, and so on. As with nearly all the tables, it also has pointers to related tables as shown in FIG. 5. Table 506 contains information on the services offered by the vendor, such as rates and service identifiers. If a vendor offers only one service, this table will contain one record for the vendor. Table 508 contains data on the areas serviced by the vendor. This list can include names of town, cities, metropolitan area, counties, and so on. A Service Data table 510 contains a list of all the broad categories of services available in the marketplace and is used by the online marketplace application to accept a service description from a customer and match the service with vendors offering the service, thus tables 510 and 506 share data. Service Data table 510 shares data with a Schedule Data table 512 which, in addition to the four vendor tables described above, also contains vendor specific data. Table 512 contains schedule data for a particular vendor, such as hours of operation for each day of the week. This data allows the marketplace application to handle scheduling between a customer and vendor.

Comment Data table 514 contains feedback and review data from customers regarding a specific vendor. Specifically, each comment from a customer is assigned a comment identifier, a date, rating, and vendor identifier. As described above, a customer can look at reviews of vendors by previous customers and can provide his own review of the service. Table 514 stores this data and associates it with the vendor so it can be retrieved and displayed when a customer makes a query.

Job Data table 516 stores data on individual transactions between a customer and a service offered by a vendor. This data is used to itemize each transaction between a customer and a service provided by a vendor. If a vendor has provided multiple services to a customer, there is a separate record for each service. It stores information such as completion date, confirmation code, job identifier, rate, transaction date, transaction time, and similar information. Job Location Data table 518 stores data on where the service was provided which is typically the old or new address of the customer, but may be different.

Service Areas table 520 stores the names of service areas as defined by the host. This data is then used to search for vendors operating in a particular service area. The customer enters a host-defined service area and tables 520 and 508 are used to retrieve vendors operating in the host-defined service area entered by the customer. A similar relationship exists between tables 510 and 506 in that the customer enters a host-defined service category. The data in tables 510 and 506 is used to retrieve vendors offering the service category entered by the customer.

Customer data is stored in Customer table 522 and Customer Contact Data table 524. In a preferred embodiment, this data is initially captured by the host when a customer is making a reservation for rental moving equipment, as described in FIGS. 2A to 2E. Table 522 contains many data fields that may not be used by the online marketplace application and are only needed for the reservation system. Some of the data fields stored in table 522 used by the online marketplace application include name, address, email, and password. Similar to Vendor Contact Data table 504, Customer Contact Data table 524 stores data relating to contact information for the customer such as address, phone number, and the like.

Figure 6:
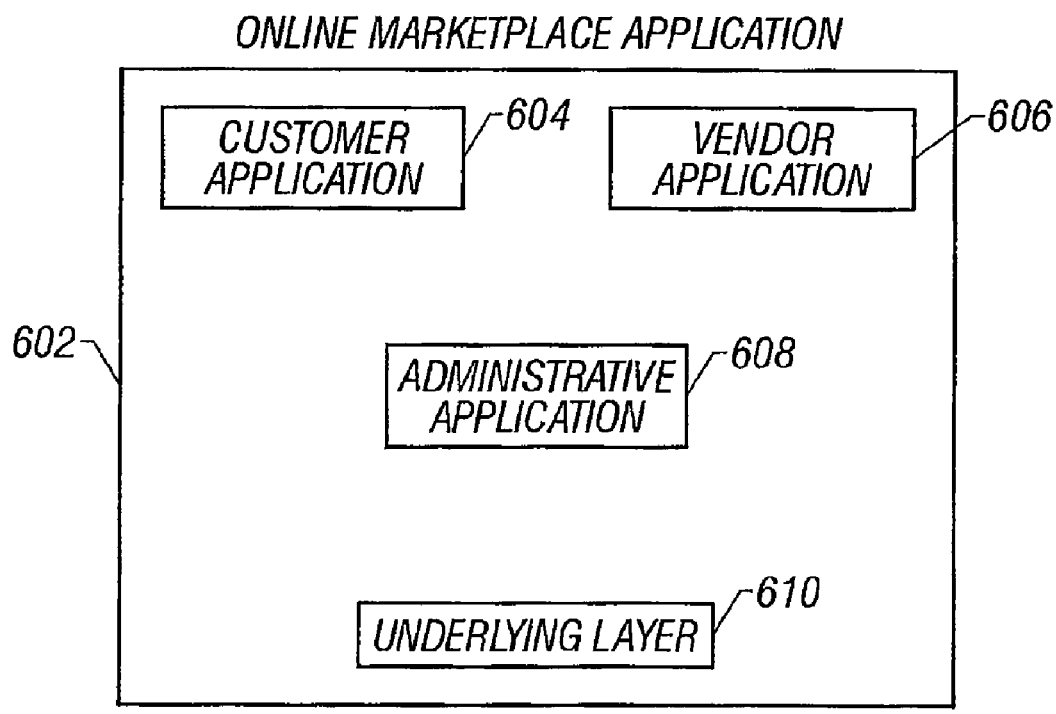
FIG. 6 is a block diagram of an online marketplace application in accordance with one embodiment of the present invention.

FIG. 6 is a block diagram of an online marketplace application in accordance with one embodiment of the present invention. An online marketplace application 602 contains four primary components: Customer Application 604, Vendor Application 606, Administrative Application 608, and Underlying Layer 610. Customer Application 604 allows the customer to navigate through the marketplace. It enables a customer to browse content of a selected vendor as described in FIGS. 3B and 3C and step 110 of FIG. 1B. It also provides the functionality of selecting and paying for a service from a particular vendor. After the service is completed, it provides the functionality for accepting feedback and comments from the customer regarding the vendor. It also allows a customer to review the transactions that have been paid for before and after a job is completed.

Vendor Application 606 provides functionality for vendors to complete necessary tasks. Initially, it processes vendors being added to the lists maintained by the host. It handles the logging on process for vendors entering the marketplace and processes confirmation codes entered by a vendor to transfer money from an account to the vendor's account. It also processes scheduling services for the vendors and provides schedules to vendors. Administrative Application 608 allows an administrator of the online marketplace to oversee the entire application and perform basic administrative functions. A few examples of this include assigning a particular city to a service area or adding a new category of services to the services offered in the marketplace. It also allows an administrator to access data for analysis and creating statistics on customer behavior. Underlying Layer 610 provides the groundwork or foundation for the applications to function. For example, it maps the database described in FIG. 5 for the applications and determines the overall look and feel of the online marketplace application.

In another preferred embodiment, the customer can enter the marketplace directly without going through an initial transaction, such as renting a truck or trailer. By directly entering the marketplace, the customer can purchase services in a manner described above, with the additional steps of providing more personal information which would otherwise be captured from the host by the marketplace. In addition, the marketplace may provide estimates on the number of hours needed for a service based on queries posed directly to the customer since it cannot rely on information from a host. Once the customer has completed a transaction in the marketplace, he can enter a host web site from the marketplace to purchase other goods or services related to moving and relocating. Furthermore, the marketplace can offer services as well as goods related to moving from which a customer can select, although most of the items listed will likely be services such as those described above. Goods related to moving may include items such as boxes, packing supplies, and the like. The online marketplace may draw the customer to a site initially. For example, the customer may be thinking about all the services he may need weeks before the move or the time he will actually rent a trailer or truck. He may want to make arrangements for loading and unloading, packing, housecleaning, etc. first and then turn attention to renting moving equipment or making hotel reservations at his destination. From the marketplace, the customer can go to a web site for other such services or goods.

What is claimed is:

1. A method of providing services via a computer network marketplace, the method comprising:
   enabling a customer in the computer network marketplace to access content regarding a service, wherein the content includes information relating to a plurality of vendors that offer the service;
   enabling the customer to select a vendor from the plurality of vendors;
   processing a transaction for the service between the customer and a vendor selected by the customer;
   accepting a payment from the customer for the service;
   associating a confirmation code with the transaction, wherein the confirmation code is known to the customer without being revealed to the vendor before performance of the service is completed;
   communicating to the vendor information relating to the transaction;
   instructing at least one of the customer and the vendor that payment to the vendor will be activated upon submission of the confirmation code; and
   after performance of the service, activating a payment to the vendor for the service in response to submission of the confirmation code.

2. The method of claim 1 wherein the service relates to moving or relocating.

3. The method of claim 1 wherein the content regarding the service includes loading or unloading service information.

4. The method of claim 1 wherein the content regarding the service includes packing or unpacking service information.

5. A method of claim 1 wherein the content regarding the service includes landscaping service information, lawn service information, cleaning service information, painting service information, or garbage removal service information.

6. A method of claim 1 wherein the content regarding the service includes hotel reservation information.

7. The method of claim 1 further comprising accepting feedback input from the customer relating to the vendor.

8. The method of claim 7 further comprising processing the feedback input from the customer and assimilating the feedback input into informational content associated with the vendor.

9. The method of claim 1 wherein processing the transaction for the service includes receiving from the customer information for scheduling the service.

10. The method of claim 1 wherein processing the transaction for the service includes receiving from the customer information on an amount of labor requested in connection with the service.

11. The method of claim 1 wherein processing the transaction for the service includes presenting the customer with an estimate of an amount of labor for the service.

12. A method of providing goods via a computer network marketplace, the method comprising:
   enabling a customer in the marketplace to access content regarding a good, wherein the content includes information relating to a plurality of vendors that offer the good;
   enabling the customer to select a vendor from the plurality of vendors;

processing a transaction for the good between the customer and a vendor selected by the customer;

accepting a payment from the customer for the good;

associating a confirmation code with the transaction, wherein the confirmation code is known to the customer without being revealed to the vendor before delivery of the good is completed;

communicating to the vendor information relating to the transaction;

instructing at least one of the customer and the vendor that payment to the vendor will be activated upon submission of the confirmation code; and after delivery of the good, activating a payment for the service or good in response to submission of the confirmation code.

13. The method of claim 12 wherein the good relates to moving or relocating.

14. The method of claim 12 further comprising accepting feedback input from the customer relating to the vendor.

15. The method of claim 14 further comprising processing the feedback input from the customer and assimilating the feedback input into informational content associated with the vendor.

16. A computer system for providing services or goods via an online marketplace, the system comprising:

one or more processors;

a computer readable memory accessible by the one or more processors, the computer readable memory storing programming instructions for:

enabling a customer in the marketplace to access content regarding a service or good, wherein the content includes information relating to a plurality of vendors that offer the service or good;

enabling the customer to select a vendor from the plurality of vendors;

processing a transaction for the service or good between the customer and a vendor selected by the customer;

accepting a customer payment for the service or good;

associating a confirmation code with the transaction, wherein the confirmation code is known to the customer without being revealed to the vendor before performance of the service or delivery of the good is completed;

communicating to the vendor information regarding the transaction;

instructing at least one of the customer and the vendor that payment to the vendor will be activated upon submission of the confirmation code; and after performance of the service or delivery of the good, activating a payment for the service or good in response to submission of the confirmation code.

17. The system of claim 16 wherein the service or good relates to moving or relocating.

18. The system of claim 16 wherein the content regarding the service includes loading or unloading service information.

19. The system of claim 16 wherein the content regarding the service includes packing or unpacking service information.

20. A system of claim 16 wherein the content regarding the service includes landscaping service information, lawn service information, cleaning service information, painting service information, or garbage removal service information.

21. A system of claim 16 wherein the content regarding the service includes hotel reservation information.

22. The system of claim 16 wherein the computer readable memory further stores programming instructions for accepting feedback input from the customer relating to the vendor.

23. The system of claim 22 wherein the computer readable memory further stores programming instructions for processing the feedback input from the customer and assimilating the feedback input into informational content associated with the vendor.

24. A method of providing services via a computer network marketplace, the method comprising:

enabling a customer in the marketplace to access content regarding a service, wherein the content includes information relating to a plurality of vendors that offer the service;

enabling the customer to select a vendor from the plurality of vendors;

receiving information from the customer for entering into a transaction for the service with a vendor selected by the customer;

receiving a payment for the service;

communicating to the vendor information relating to the transaction;

associating a confirmation code with the transaction, wherein the confirmation code is known to the customer without being revealed to the vendor before performance of the service is completed;

instructing at least one of the customer and the vendor that payment to the vendor will be activated upon submission of the confirmation code; and after performance of the service, activating a payment for the service in response to submission of the confirmation code.

* * * * *